Nov. 9, 1971   F. DUC   3,618,224
PROCESS AND APPARATUS FOR PRODUCING DRIED FRUITS
Filed June 30, 1970   3 Sheets-Sheet 1
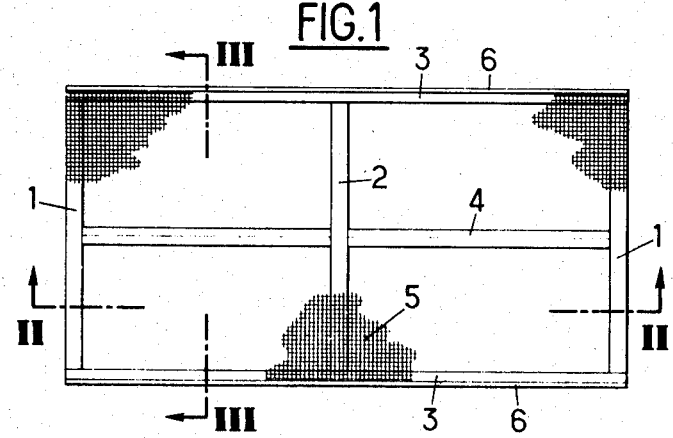
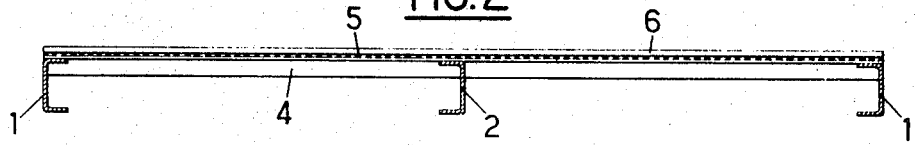
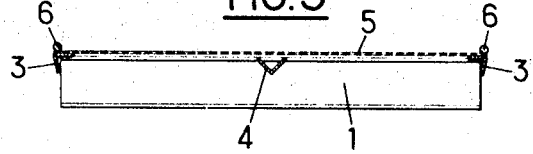
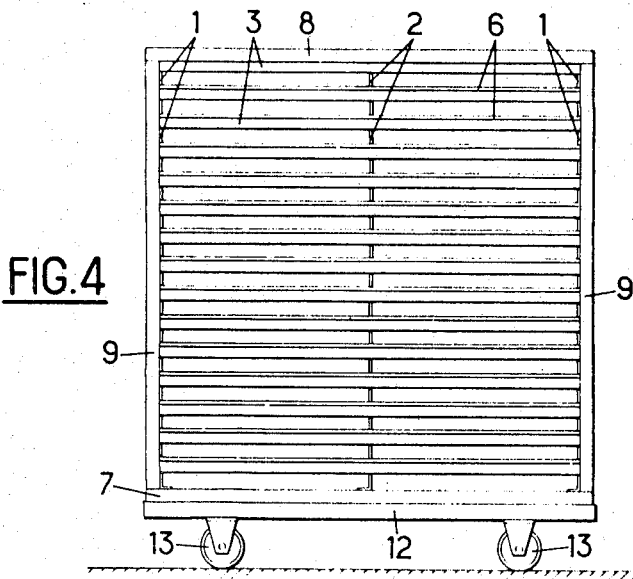
INVENTOR
FRANCOIS DUC
BY
*Stevens, Davis, Miller & Mosher*
ATTORNEYS

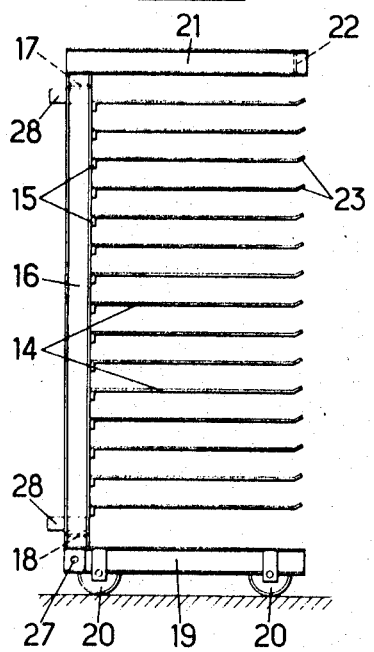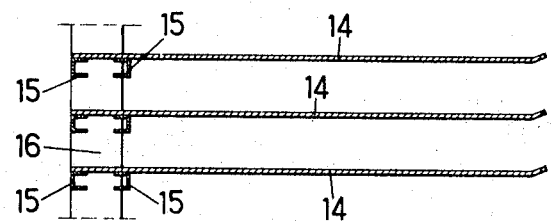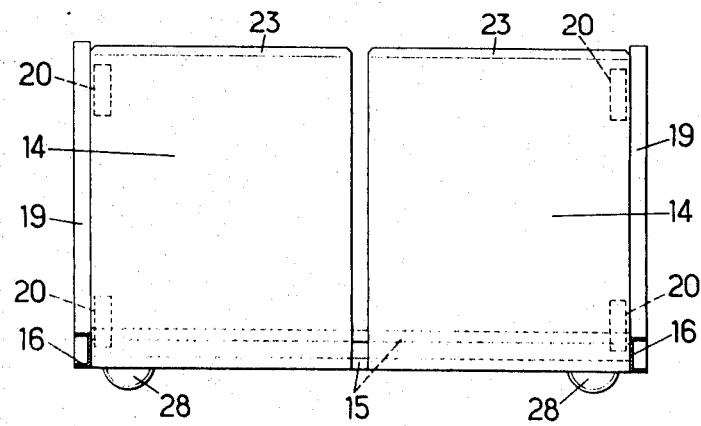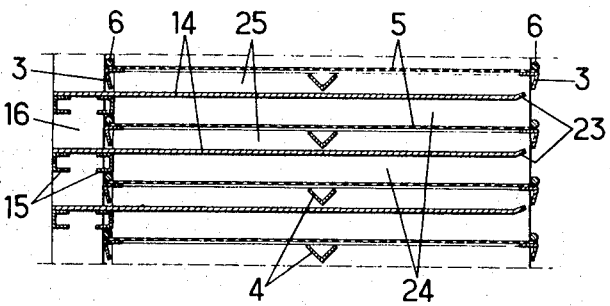

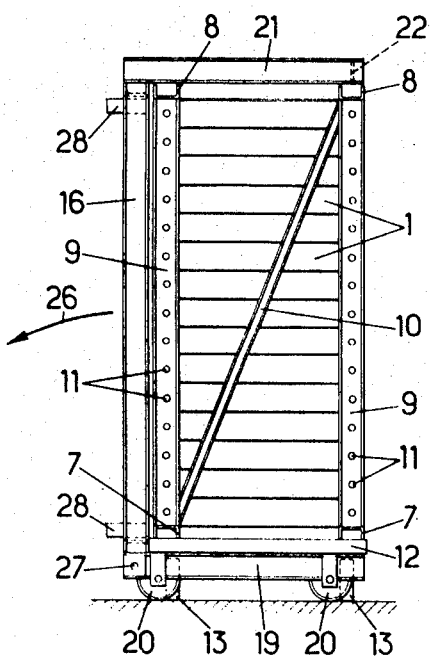
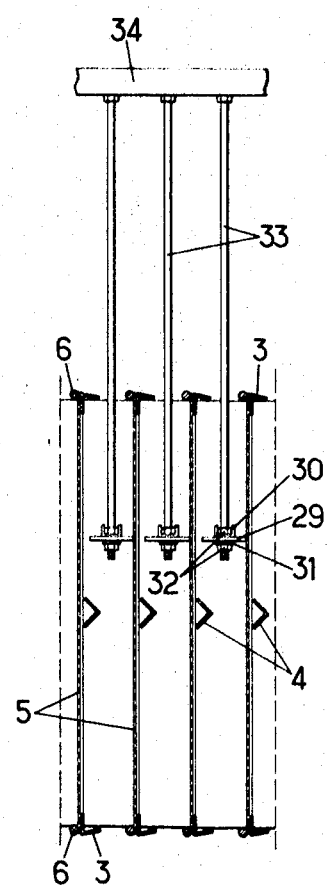

United States Patent Office 3,618,224
Patented Nov. 9, 1971

3,618,224
PROCESS AND APPARATUS FOR PRODUCING DRIED FRUITS
François Duc, "La Sabatiere," 24 Bergerag, France
Filed June 30, 1970, Ser. No. 51,262
Claims priority, application France, Nov. 4, 1969, 6937910; Apr. 30, 1970, 7015861
Int. Cl. F26b 19/00
U.S. Cl. 34—12    6 Claims

ABSTRACT OF THE DISCLOSURE

The invention relates to improvements in the techniques for drying fresh fruits. A unitary multiple tray structure is provided as well as a corresponding unitary multiple baffle structure. The two are designed to intermesh whereby the baffles close off various boundaries of the respective trays and the assembled pair of structures is then tiltable to a position whereby the trays assume a vertical position to have fruit dropped thereinto with the baffles serving to guide the fruit and to maintain it in a single layer relative to each tray.

---

This invention relates to an improved apparatus and process for producing dried fruits from fresh fruit, such as for producing dried prunes.

Normally, fresh fruit is picked, washed, and sorted and then arranged by hand in single layers in individual trays or pallets which are then stacked on a wagon which carried the stacked trays through a drying enclosure, the stacking being such so as to permit air circulation between the respective trays. Subsequently, the trays are unstacked by hand and the dry fruit is separated and removed, also by hand. Consequently, the drying technique as a whole is time consuming and costly in that it requires a large number of manual workers.

An object of this invention, therefore, is the realization of an apparatus and process which lessen the number of manual workers required in a fruit drying operation and which also provide an improved drying of the fruit.

Generally, the invention involves the provision of a unitary multiple-tray structure, to replace the commonly used individual fruit-holding trays, and the further provision of a unitary multiple-baffle structure whose baffles are arranged to intermesh with the trays of the tray structure so as to define fruit holding horizontal layers alternating with circulatory air layers. The intermeshed structures are unitarily tiltable whereby the aforementioned horizontal layers become vertical in order to permit the dropping of fruit vertically into said fruit holding layers, the baffles serving to guide said fruit and maintain it in a single layer against the trays until the structure is retilted whereby the trays are horizontal again, at which time the baffles are withdrawn. The tray structure, loaded with fruit, is then passed through a drying compartment after which the baffle structure is again inter-engaged with the tray structure and the combined pair are tilted to position the fruit layers vertically so that the dried fruit may be vertically discharged through one end of the tray structure.

Details of a preferred embodiment of realization of the invention are as follows with reference to the accompanying drawings, wherein:

FIG. 1 is a plan view of a tray according to the invention;

FIG. 2 is an enlarged section view taken along line II—II of FIG. 1;

FIG. 3 is a section view taken along line III—III of FIG. 1;

FIG. 4 is a front elevation view of a unitary multiple tray structure according to the invention;

FIG. 5 is a side elevation view of a unitary multiple baffle structure according to the invention;

FIG. 6 is an enlarged partial view of the baffle structure of FIG. 5;

FIG. 7 is a top plan view of the baffle structure according to this invention;

FIG. 8 is a side elevation view showing the tray structure intermeshed with the baffle structure;

FIG. 9 is an enlarged partial detail view of the structure of FIG. 8; and,

FIG. 10 is an enlarged partial detail view of the intermeshed structures in tilted position.

The apparatus comprises a plurality of trays as shown in FIGS. 1 through 3, each made up of a frame formed by two horizontal end beams 1, and preferably reinforced by a median beam 2, and two cross beams 3 preferably with an intermediary beam 4 in two halves. The beams 1 and 2 are, for example, U-shaped channels arranged as shown in FIG. 2, the height of which equals the size of the fruits plus a clearance for air space (that is about 9 cm. in the case of prunes). The cross beams 3 are angle irons (right angle or slightly sharper angle), one flange of which is fastened to the ends of the beams 1. The height of these angle irons is smaller than that of the channels in order to allow sufficient room for the fruits to pass thereunder. The intermediate beams 4, in two halves, are also angle irons, set diagonally, as shown in FIG. 3.

A metal screen 5 spreads across the framework defined by the aforementioned members 1, 2, 3 and 4 and is affixed thereto by soldering. The mesh of the screen is small enough so as to hold the particular fruit thereon without it falling through the screen holes. A pipe or rod 6 is affixed, as by welding or brazing, along the length of each iron 3 on their upper sides so as to impede the fruit from rolling off the tray top. Members 6 are so spaced from each other that channels 1 and 2 of the next upper tray fit between members 6. This permits stacking of a large number of trays with the lower flanges of the channels 1 and 2 resting upon the corresponding upper flanges of the channels 1 and 2 of the next lower tray. A sturdy tray stack results with the respective web portions of the outer channels 1 forming continuous vertical end walls while the vertically aligned webs of intermediate channels 2 form what amounts to a continuous intermediate wall.

FIGS. 4 and 8 illustrate a unitary multiple tray structure 12 according to this invention. Said structure is built up of two lower lateral inverted channel members 7 and two upper channels 8, the upper ones being supported from the lower ones by four columnar channels 9. These channels are all fixed to each other as by welding or other known joining techniques. Braces, such as 10, may also be provided to provide rigidity.

The vertical channels 9 include a plurality of vertically spaced holes 11 to permit fixing of the trays to the structure by bolts extending through corresponding holes in tray channels 1. It is thus a simple matter to securely assemble and disassemble a plurality of trays. Wheels 13 are included on the tray structure 12.

FIGS. 5 to 7 illustrate the unitary multiple baffle structure according to the invention. Each level, as seen in FIG. 7, comprises two coplanar baffle sections 14 made, for example, of sheet metal, medially spaced apart to accommodate the intermediate channel member 2 of the trays. Each baffle section 14 is sized so as to be able to fit easily between each channel member 1 and the intermediate member 2, and each baffle section is sturdy enough to remain rigid although it is supported at only one edge portion thereof. As seen in FIG. 6, each tray 14 is welded to each of two horizontally spaced apart channel members 15 which in turn are supported between two spaced apart vertical channels 16. The structure further includes horizontal braces 17 and 18 extending between channels 16. The framing is completed by lower horizontal beams 19 upon which the wheels 20 are mounted and upper protective beams 21 and 22, all of which beams are supported on the vertical channels 16.

The respective structures of FIGS. 4 and 5 are so designed that when rolled over a flat horizontal ground surface they will interengage each other with the respective baffles 14 fitting between respective ones of the trays, as clearly shown in FIGS. 8 and 9. When interengaged, beams 19 and wheels 20 are positioned alongside wheels 13.

Especially important, however, is the fact that each baffle fits closely adjacent to the lower edges of the vertically extending flanges of irons 3 while the inner channel 15 is aligned with the member 6 thereby closing the vertical gap between member 6 and the angle irons 3 of the next upper tray.

The free end 23 of the baffle fits closely enough to the edge of the other angle iron 3 to prevent passage of any fruit therebetween.

As seen in FIG. 9, the interengaged structures create a number of fruit layers 24 vertically alternating with air circulatory layers 25. The fruit layers 24 are only open at one side (the right hand side in FIG. 9) for the entry of fruit thereinto.

In order to carry out a fruit loading operation, it is necessary to interengage the tray and baffle structures and to then tilt the interengaged assembly in the direction of arrow 26 (FIG. 8). To facilitate this, holes 27 are provided near the bottom of the baffle structure and these are provided with suitable pivot pins.

In tilted position the assembly rests upon the baffle structure wheels 28 whose rotational axes are perpendicular to those of wheels 13 and 20. The assembly is then rolled on wheels 28 to under a fruit hopper which drops washed and sorted fruit only into the respective vertical compartments 24 though the top or open end thereof, this corresponding to the right hand end shown in FIG. 9. When compartments 24 are filled, the assembly is tilted back to the standing position of FIG. 8 and the baffle structure is then disengaged from the tray structure, the latter then being passed through a drying chamber while the former may be used with another tray structure. This means that a small number of baffle structures can service a larger number of tray structures.

After the drying procedure, each tray structure is tilted as previously without, however, being engaged with the baffle structure (see FIG. 10). This means that the opposite ends of the trays are both open (the upper and lower ends in FIG. 10) so that a scraper may be introduced through the upper end to strip fruit off the screens 5, the fruit in turn falling out through the bottom end of each tray.

Each scraper may comprise a leather or rubber strip 29 stiffened by washers 30 and 31 and secured by nuts 32 to a rod 33. A plurality of such scrapers can be operated simultaneously from a vertically displaceable head 34. Rods 33 are flexible or tiltable to achieve the proper entry angle relative to compartments 24. The strips 29 are bendable to avoid damage to the fruit.

This whole apparatus presents a true simplicity of design, true security as well as simple application, plus allows for the drying of fruits or other products with an absolute minimum of manhandling. The few areas of manual labor could easily be automated. It is understood that the realization as described above, is not in a final form and can be the object of any desirable modifications within the framework of the invention.

What is claimed is:

1. A fruit drying apparatus, comprising: a multiple tray structure comprising a plurality of horizontal trays vertically spaced apart from each other, a multiple baffle structure comprising a plurality of horizontal baffles vertically spaced apart from each other, the two aforementioned structures being interengaged to form an assembly wherein said baffles respectively extend horizontally between successive ones of said trays, each baffle defining with the top of its adjacent lower tray a first compartment closed at one end and open at an opposite end, said ends being horizontally spaced apart from each other, and each baffle defining with the bottom of its adjacent upper tray a second compartment closed at its end corresponding to said open end of the first compartment, said assembly being tiltable to a position whereby said ends are vertically spaced apart from each other with said open end being the upper of the two, whereby fresh fruit may be dropped into each said first compartment through said open ends.

2. The apparatus of claim 1, including a means adapted to move vertically along the extent of said first compartment to scrape dried fruit off said trays.

3. The apparatus of claim 1, said trays comprising a flat open mesh surface for supporting fruit therein, said trays being vertically spaced apart from each other a distance in excess of the height of the fruit to be dried.

4. The apparatus of claim 1, said baffle structure comprising a rigid frame having said baffles extending in cantilever fashion therefrom, said baffles being insertable between respective ones of said trays at a distance from the adjacent lower tray, a means on each said baffle spaced from the free end thereof and closing said baffle and the adjacent lower tray, the free end of each said baffle fitting in close proximity to the lower edge of the adjacent upper tray.

5. The apparatus of claim 1, said baffle structure comprising respective sets of wheels rotatable about mutually perpendicular axes whereby a first set permits rolling of the baffle structure along the ground while the baffles are in substantially horizontal position and a second set permits such rolling when the structure is tilted so that the baffles are in substantially vertical position.

6. A process for drying fruits, comprising the steps of:
 (a) providing a series of vertically aligned horizontally extending trays separated from each other a distance in excess of the fruit height;
 (b) interposing a baffle means between successive ones of said trays so as to define between each pair of trays two separate horizontal compartments;
 (c) tilting said trays and baffles to a vertical position and dropping fruit only into each compartment defined by each baffle and the previously lower adjacent tray;
 (d) returning the trays and baffles to their horizontal positions and withdrawing the baffle from the trays;
 (e) passing the trays through a drying chamber; and
 (f) retilting the trays to a vertical position and discharging the dry fruit therefrom.

References Cited
UNITED STATES PATENTS 3,283,931  11/1966  Gerrans _____ 34—238 X
3,103,422  9/1963  Green _____ 34—238

FREDERICK L. MATTESON, JR., Primary Examiner

W. C. ANDERSON, Assistant Examiner

U.S. Cl. X.R.

214—16.6; 34—194, 236, 238